(12) United States Patent
Woodings

(10) Patent No.: US 8,027,789 B2
(45) Date of Patent: *Sep. 27, 2011

(54) WIRELESS LOCATING AND MONITORING SYSTEM

(75) Inventor: Ryan W. Woodings, Boise, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/815,377

(22) Filed: Jun. 14, 2010

(65) Prior Publication Data

US 2010/0312419 A1    Dec. 9, 2010

Related U.S. Application Data

(63) Continuation of application No. 11/567,144, filed on Dec. 5, 2006, now Pat. No. 7,761,232.

(60) Provisional application No. 60/742,962, filed on Dec. 6, 2005.

(51) Int. Cl.
*G01C 21/00* (2006.01)

(52) U.S. Cl. ........................................ 701/213; 701/200

(58) Field of Classification Search .......... 701/200–202, 701/213–215, 1–2; 342/357.06
See application file for complete search history.

(56) References Cited

U.S. PATENT DOCUMENTS

| | | | |
|---|---|---|---|
| 4,891,650 A | 1/1990 | Sheffer | |
| 5,898,391 A | 4/1999 | Jefferies et al. | |
| 6,522,267 B2 | 2/2003 | Flick | |
| 6,606,562 B1 | 8/2003 | Gifford | |
| 6,737,989 B2 | 5/2004 | Flick | |
| 6,892,131 B2 * | 5/2005 | Coffee et al. | 701/200 |
| 7,106,189 B2 | 9/2006 | Burneske et al. | |
| 7,181,220 B2 | 2/2007 | Tsui | |
| 7,246,009 B2 | 7/2007 | Hamblen et al. | |
| 7,321,814 B2 | 1/2008 | Kanda et al. | |
| 7,761,232 B2 | 7/2010 | Woodings | |
| 2003/0081122 A1 * | 5/2003 | Kirmuss | 348/148 |
| 2005/0040232 A1 | 2/2005 | Maloney | |
| 2009/0088924 A1 * | 4/2009 | Coffee et al. | 701/33 |

OTHER PUBLICATIONS

International Search Report of the International Searching Authority for International Application No. PCT/US06/61654 dated Feb. 25, 2008; 3 pages.

The Written Opinion of the International Searching Authority for International Application No. PCT/US06/61654 dated Feb. 25, 2008; 4 pages.

USPTO Notice of Allowance for U.S. Appl. No. 11/567,144 dated Mar. 9, 2010; 6 pages.

USPTO Notice of Allowance for U.S. Appl. No. 11/567,144 dated Jan. 29, 2010; 6 pages.

USPTO Non-Final Rejection for U.S. Appl. No. 11/567,144 dated Aug. 14, 2009; 7 pages.

* cited by examiner

*Primary Examiner* — Yonel Beaulieu

(57) ABSTRACT

A wireless tracking device located in a vehicle, the device including a positioning system to periodically determine a location of the device, a processor connected to the positioning system to receive a vehicle sensor input indicating the vehicle status, a scanner to scan for an available wireless area network access point, and a wireless radio connected to the processor to transmit data to the available wireless area network access point.

20 Claims, 3 Drawing Sheets

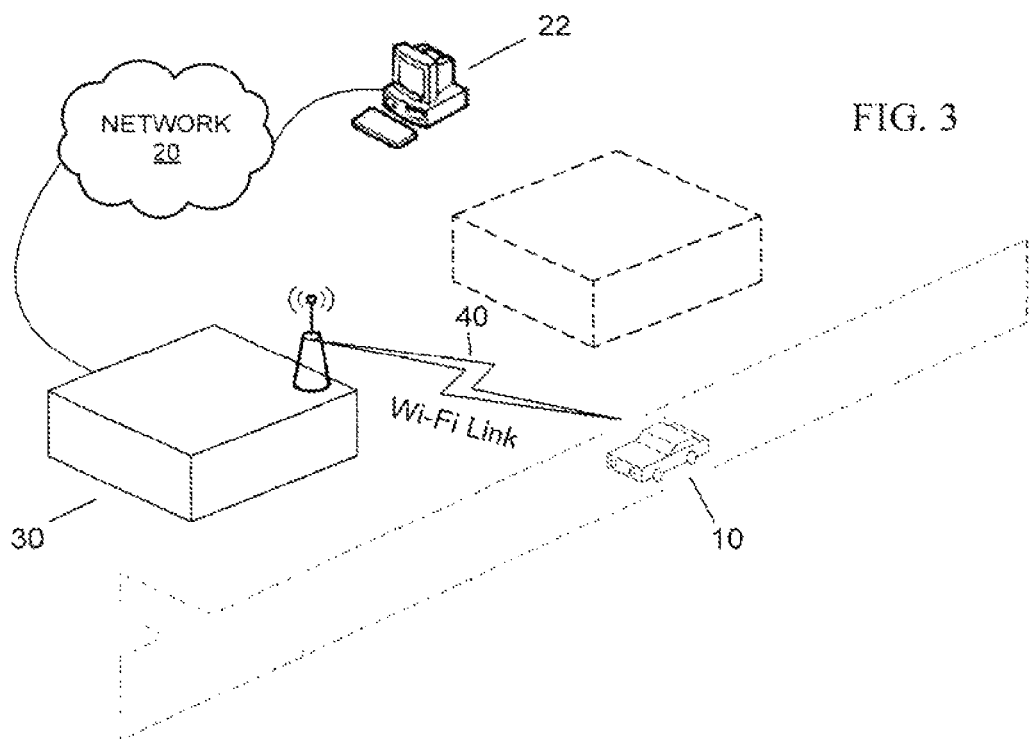
FIG. 3
FIG. 4
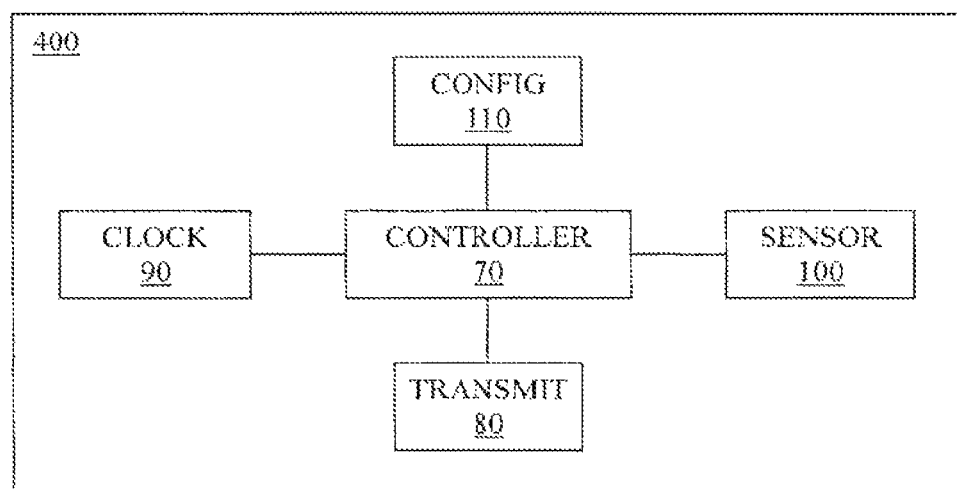

US 8,027,789 B2

WIRELESS LOCATING AND MONITORING SYSTEM

RELATED APPLICATIONS

This patent application is a continuation of U.S. patent application Ser. No. 11/567,144, filed Dec. 5, 2006, now U.S. Pat. No. 7,761,232, which claims priority to U.S. Provisional Patent No. 60/742,962, filed on Dec. 6, 2005, which is herein incorporated by reference in its entirety.

BACKGROUND OF THE INVENTION

The present invention relates generally to networks, and in particular to networks used for tracking vehicles, aircraft, vessels, equipment and other property.

Vehicle tracking is the ability for a user such as a vehicle owner or fleet owner to monitor the location, speed and direction of a vehicle at a given time. It is desirable for fleet owners to monitor the distance and routes driven to find inefficiencies, and to monitor speed to determine safety of driving and fuel consumption. For aircraft or boat owners or operators (e.g. commercial fishermen), it may be desirable to have their location known by the Coastguard in the event of an emergency.

Conventional vehicle tracking systems employing global positioning systems (GPS) use cellular telephone technology to transmit the location of the vehicle. The location of the vehicle may be transmitted to a car rental agency, local authorities, or to a third-party monitoring company. These conventional systems usually require a monthly subscription for the wireless communication link. FIG. 1 shows a conventional solution that is used for tracking vehicles, including a vehicle 10 equipped with a tracking device and a communication device operating in a cellular network 16. Cellular tower 14 provides the cellular network 16. The cellular network 16 is typically integrated with the Plain Old Telephone System (POTS) for communication with a third party operator 18.

The conventional system requires the third party operator 18 to receive signals from the vehicle 10 and monitor its location. Vehicle location systems are operated by police to find vehicles reported as stolen. The conventional solution hardware comprises a telephone 18 and communicates using a modem data transfer for example.

Conventional solutions are expensive and inflexible. Many people do not own a vehicle tracking device because a monthly subscription for the wireless communication link is expensive. Some people do not want a third party to be able to track their vehicle, and so do not join these conventional services.

The present invention addresses these and other problems associated with the prior art.

SUMMARY OF THE INVENTION

An improved wireless tracking device is herein disclosed, the wireless tracking device including a positioning system for determining a location of the device and a processor connected to the positioning system. The wireless tracking device further including a wireless radio connected to the processor for transmitting the location of the device across a wireless area network.

An improved vehicle monitoring system is herein disclosed, the vehicle monitoring system including a sensor, a microcontroller configured to receive a sensor input from the sensor and determine a vehicle condition data, and a wireless transmitter in communication with the microcontroller. The wireless transmitter is configured to transmit the vehicle condition data to a remote data network access point.

An improved method of monitoring a vehicle is herein disclosed, the method including determining a status of the vehicle, locating an available wireless data network access point, and transmitting the status of the vehicle though the access point.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3 illustrates operation of a vehicle tracking device using a wireless data network.

FIG. 4 illustrates a system block diagram of a wireless vehicle monitoring system.

DETAILED DESCRIPTION

Third party tracking systems have been monitoring vehicle locations for a number of years. For example, car rental agencies may limit the operation of their fleet vehicles to a restricted area of use. If a rental car is driven outside of this restricted range, the operator may be subject to additional fees or a car insurance policy may be voided. These systems do not benefit the operator of the vehicle and to the contrary, provide a certain amount of invasion of privacy. Other third party systems are designed to provide assistance to the operator of the vehicle, but offer only restricted or limited benefits. If a vehicle operator or the vehicle is lost, for example, the vehicle operator may contact the third party to obtain assistance or directions. Third party systems that work with police agencies also have a narrow scope of purpose, and are similarly inflexible in application. In all instances, the vehicle operator is subject to the terms and conditions of the third party system, suffers a loss of privacy, and is unable to manage the flow of vehicle information and other personal data.

Figure 1:
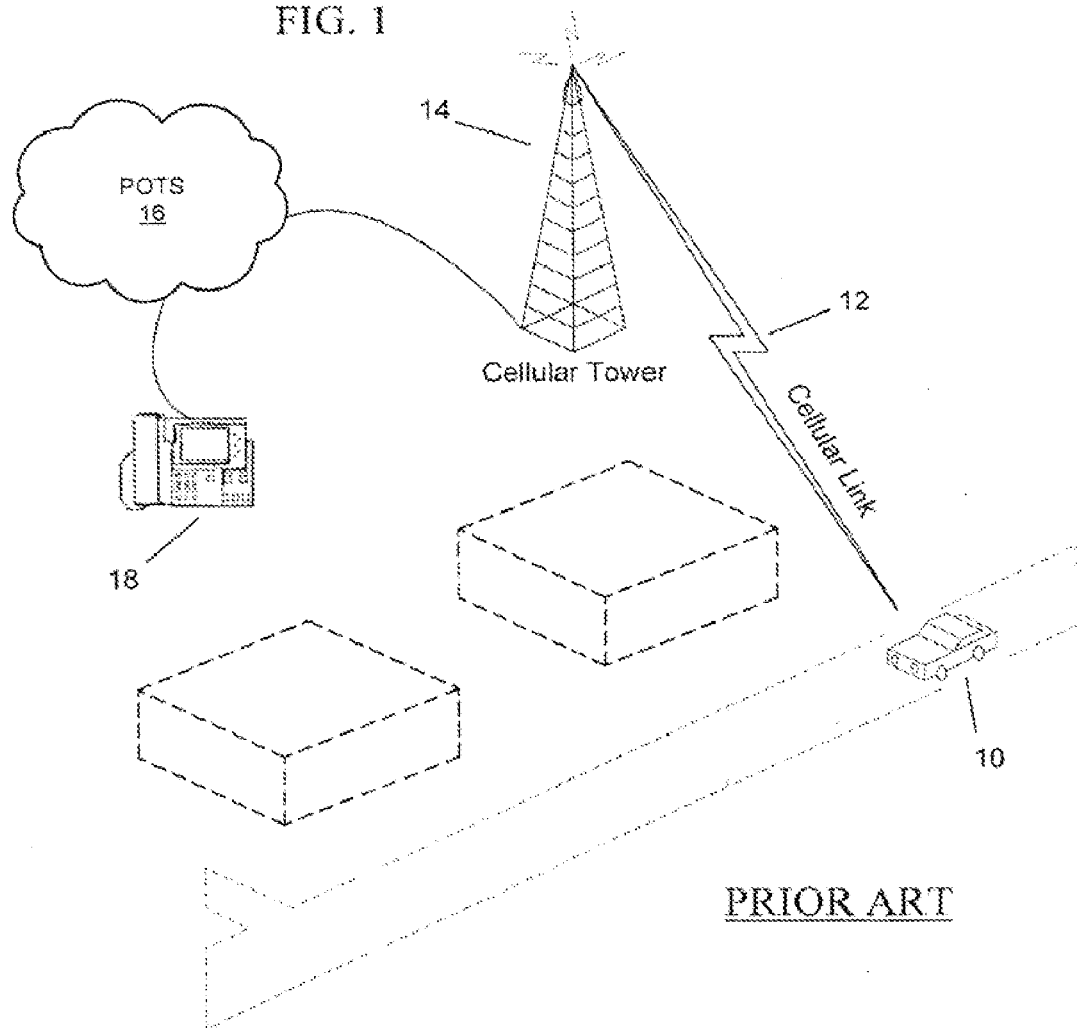
FIG. 1 illustrates a conventional vehicle tracking solution using a cellular telephone network.
Figure 2:
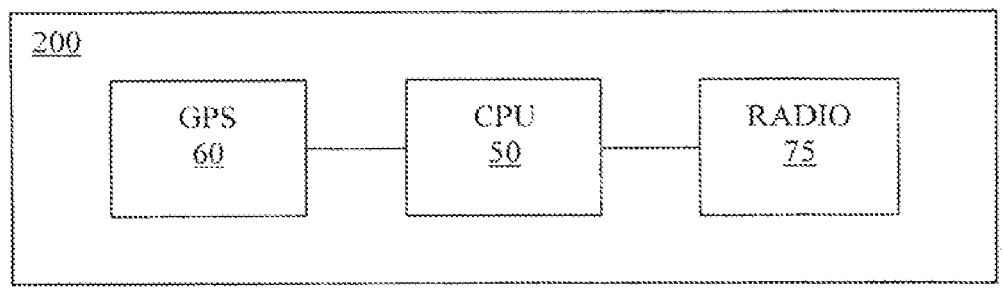
FIG. 2 illustrates a system block diagram of wireless tracking device.

FIG. 2 illustrates a system block diagram of a novel wireless tracking device 200 disclosed herein. The tracking device 200 includes a positioning system 60 for determining a location of the device. The positioning system 60 may include a global positioning system (GPS) device, for example. The tracking device 200 further includes a processor 50 connected to the positioning system 60 and a wireless radio 75 connected to the processor 50 for transmitting the location of the tracking device 200 across a wireless area network.

FIG. 3 illustrates an example operation of a vehicle tracking device using a wireless data network. The example operation may be implemented using the wireless tracking device 200 of FIG. 2. Tracking device 200 may be installed in a vehicle 10 to determine its location. The vehicle 10 is understood to include any vehicle, aircraft, vessel, equipment or other property that may be similarly tracked.

The positioning system 60 may be used periodically to determine the location of the tracking device 200 provided in vehicle 10. The vehicle 10 may be stationary or in motion. GPS services are free to use and are available worldwide, providing the ability to locate the vehicle 10 globally. The wireless radio 75 of tracking device 200 scans for available access points, such as access point 30, which provide access to a data network 20.

Access point 30 may include a public access point, a pay-per-use access point or a subscription access point. A public access point may be part of a wireless municipal access network (WMAN), which is offered by some cities as a free service. A pay-per-use access point may be provided as a service to customers of a restaurant, store or coffee shop, for example. A pay-per-use access point may charge a predetermined rate according to a number of minutes used for access to the data network 20. A subscription access point may provide access to the data network 20 for members who have previously subscribed to the network service. The subscription access point may require a password or member login.

In one embodiment, the access point 30 includes a residential or business wireless hub that provides access to the Internet. The wireless hub may include a firewall which partitions residential or business processor applications and data into private and public segments. The vehicle 10 may be allowed access to the public applications and data in connecting to the Internet, but would be denied access to the private applications and data.

The vehicle 10 establishes a network link 40 with the access point 30. The network link 40 is made according to the protocol associated with the access point 30. Access to the data network 20 may be provided by the access point 30 operating in a wireless local area network (WLAN) or WMAN according to the Institute of Electrical and Electronics Engineers (IEEE) standards IEEE 802.11 or IEEE 802.16 (WiMAX Worldwide Interoperability for Microwave Access). Access point 30 provides access to the data network 20. Whereas the vehicle communicates with the access point 30 by a wireless network link 40, access point 30 may be connected to the data network 20 by cable, digital, fiber optics, satellite, or any other conventional means.

The location of the vehicle 10 may be transmitted across the data network 20 to an endpoint 22. Endpoint 22 may include a computer, a personal digital assistance, a cell phone, an email address, a website, the police, or any other destination in communication with the data network 20.

The wireless radio 75 (FIG. 2) is configurable to periodically scan for available access points. When an access point is found, the location of the vehicle 10 is transmitted through the access point 30 onto the data network 20. In one embodiment, the data network 20 includes or is connected to the Internet. The location of the vehicle 10 may then be transmitted to the endpoint 22, such as the vehicle owner's computer or a website, allowing the vehicle owner or other interested person to track the vehicle's location. If the vehicle 10 has been stolen, the location of the vehicle may be concurrently or alternatively transmitted to the police.

The wireless radio 75, such as a WLAN radio, may be used to passively scan for access points, similar to the functionality of some wireless network monitoring software. Passive mode scanning listens for an available network, but does not transmit any radio frequency (RF) signals during the scan phase. Passive network scanning makes it difficult for thieves to find and disable tracking system until it is too late, because the RF signal is not transmitted until a connection to the access point 30 is available for data transmission.

Active mode may also be used to scan for access points, but this could alert thieves to the presence of the wireless tracking device 200. Active mode allows the tracking device 200 to proactively search for an available network, allowing the access points to be located more quickly than with passive scanning.

When an access point, such as access point 30, is found, the wireless tracking device 200 determines if the access point 30 will allow it to transmit its data. Public access points do not use encryption, and provide free access to the data network 20. Other access points require login information to access the data network 20. The wireless tracking device may be configured to provide login information when the access point 30 has been identified.

When access to the data network 20 has been confirmed or authorized the wireless radio 75 (FIG. 2) sends a short message containing the vehicle location to the access point 30, across the data network 20 and to the endpoint 22. The short message may include a time of day and vehicle status information. The transmission to the endpoint 22 may be provided as e-mail, short message service (SMS), fast transfer protocol (FTP), hypertext transfer protocol (HTTP) or other Internet protocol. Depending on the protocol used, the message could be sent to a personal computer (via email), cell phone (via SMS), a website (via FTP or HTTP), or to the police. In one embodiment, vehicle data is sent to a website that updates a map showing a current location of the vehicle 10 or the vehicle's path over the past day or some other specified time period.

FIG. 4 illustrates a system block diagram of a wireless vehicle monitoring system 400. The vehicle monitoring system 400 is shown as including a sensor 100 and a microcontroller 70 configured to receive a sensor input from the sensor 100 and determine vehicle condition data. The vehicle monitoring system 400 is further shown as including a wireless transmitter 80 in communication with the microcontroller 70 and configured to transmit the vehicle condition data to a remote data network access point, such as access point 30 of FIG. 3. In one embodiment, the wireless transmitter 80 operates similarly or the same as wireless radio 75 of FIG. 2.

The microcontroller 50 may receive sensor input from one or more sensors such as sensor 100 to determine fuel level, engine temperature, warning lights, tire pressure, air bag deployment, passenger data, vehicle location, vehicle speed, vehicle direction, or other vehicle condition data. The microcontroller 50 may further receive a time of day input from a clock 90. Sensor 100 may include a GPS device or provide functionality similar to the positioning system 60. In one embodiment the microcontroller 70 operates similarly or the same as described for processor 50 in FIG. 2, to transmit a vehicle location or other vehicle condition data across a data network to an endpoint, such as endpoint 22. In one embodiment, the processor 50 in the wireless tracking device 200 of FIG. 2 may be configured to receive a vehicle sensor input and request the wireless radio 75 to transmit a vehicle status across the wireless area network.

The vehicle monitoring system 400 may include a configuration device 110 that provides an operator selectable mode of wireless transmission. For example, the mode of wireless transmission may include a selection of passive scanning, active scanning or account management of the remote data network access point. Account management may include login information, credit card or other payment information, or a user authentication. In one embodiment the mode of wireless transmission includes selection of a data transmission protocol, such as e-mail, SMS, FTP or HTTP. In other embodiment, the mode of wireless transmission includes selection of a destination of the vehicle condition data, such as a computer, a personal digital assistance, a cell phone, an email address, a website or the police.

In one embodiment, the configuration device 110 communicates wirelessly with the microcontroller 70. The connection may be made using Universal Serial Bus (USB), Wireless USB, Bluetooth, Wi-Fi or using IEEE 802.15 wireless personal area network (WPAN) for example. The configuration device 110 may be an on-board computer accessible from a user interface, a PDA, a cell phone, or a diagnostic tool.

In another embodiment, the vehicle monitoring system 400 determines if the vehicle 10 has been stolen or is being operated by an unauthorized operator. For example, sensor 100 may provide sensor input indicating that a car alarm has been activated, or that an engine ignition of the vehicle 10 occurred without an automotive key being present in the ignition switch. If the vehicle 10 is being operated by an unauthorized operator, the vehicle monitoring system 400 may transmit an alert message to the police or shut down a vehicle operation, such as the engine.

In yet another embodiment, data that is transmitted from the vehicle 10 to the access point 30 is encrypted. Encrypting the data prevents unauthorized interception of personal information that may be provided in the data. For example, the data may include an identification of the vehicle owner, a condition of the vehicle 10 (e.g. the vehicle 10 is stolen or not operational), login, password, or account information. Certain of the access points 30 may be able to decrypt the data or instead pass on the encrypted data to the data network 20 for eventual decryption at the endpoint 22.

Figure 5:
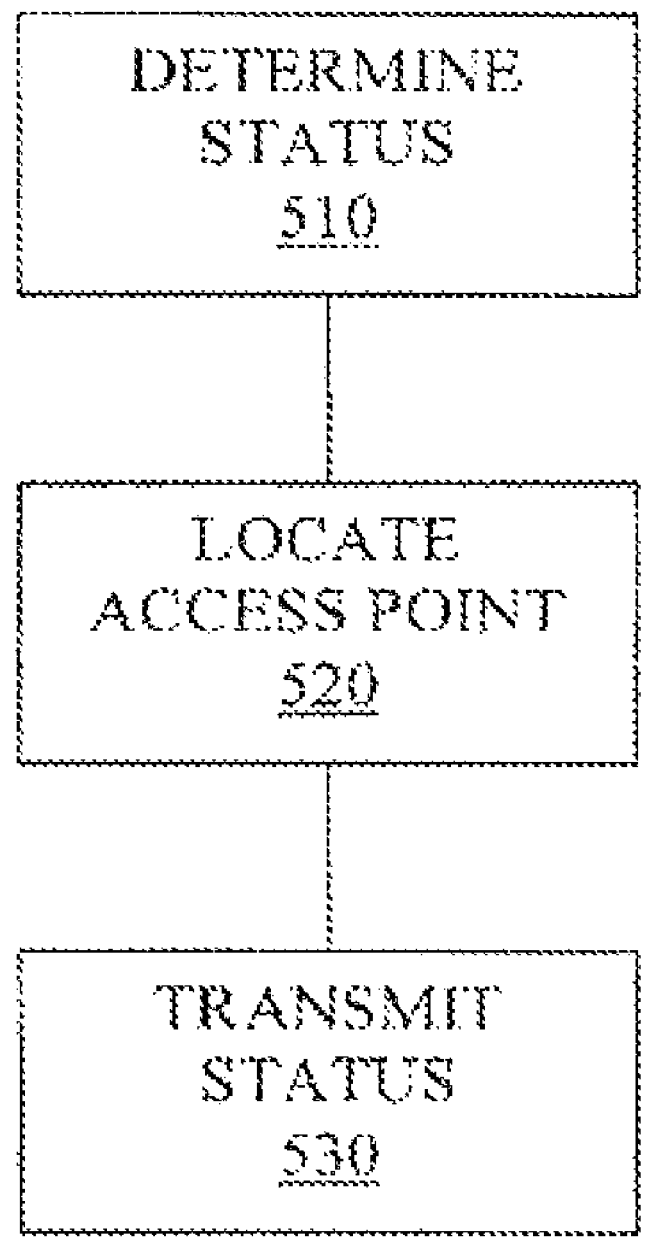
FIG. 5 illustrates a block diagram of a method for monitoring a vehicle status.

FIG. 5 illustrates a block diagram of a method for monitoring a vehicle status. In one embodiment, the vehicle monitoring system 400 of FIG. 4 may be used to perform the methods. In another embodiment, the wireless tracking device 200 of FIG. 2 may be used to perform the methods.

At operation 510 a status of the vehicle is determined. The vehicle status may include fuel level, engine temperature, warning lights, tire pressure, air bag deployment, passenger data, vehicle location, vehicle speed, vehicle direction, or other vehicle status. One or more sensors, such as sensor 100 of FIG. 4, may be provided to provide a sensor input associated with the vehicle status. A positioning system, such as positioning system 60 of FIG. 3 may also be provided to provide a vehicle status.

At operation 520 an available wireless data network access point is located. The wireless data network access point, such as access point 30 of FIG. 3, may include a public access point, a pay-per-use access point, a subscription access point or a residential or business wireless hub. The wireless data network access point may be located using passive scanning, for example where no RF signals are transmitted. In one embodiment, the wireless data network access point is located using active scanning. Active scanning may include a transmission of RF signals.

At operation 530 the status of the vehicle is transmitted though the wireless data network access point, such as access point 30 of FIG. 3. In one embodiment an access code or login is provided to the access point 30. The status of the vehicle may be transmitted over a data network, such as the Internet, to a destination or endpoint 22 such as a computer, a personal digital assistance, a cell phone, an email address, a website, the police, or any other destination in communication with the data network.

By taking advantage of the public access points, monitoring a vehicle status or a device location does not require a special monthly subscription or reliance on a third party monitoring service. This reduces the total cost of ownership of a tracking system or vehicle monitoring system, and allows a larger segment of the population to participate in order to reduce the time required to recover stolen property, for example. Pay-per-use or subscription based network access points do have an associated cost, however this network access cost is significantly less expensive than the subscription prices for tracking systems employing conventional cellular-based communication systems and third party monitoring services.

Embodiments of the present invention are well suited to performing various other steps or variations of the steps recited herein, and in a sequence other than that depicted and/or described herein. In one embodiment, such a process is carried out by processors and other electrical and electronic components, e.g., executing computer readable and computer executable instructions comprising code contained in a computer usable medium.

For purposes of clarity, many of the details of the improved solution and the methods of designing and manufacturing the same that are widely known and are not relevant to the present invention have been omitted from the following description.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method of monitoring a vehicle, the method comprising:
   from the vehicle, periodically determining a vehicle location;
   scanning to locate an available wireless data network access point; and
   transmitting a status of the vehicle through the located access point to an endpoint receiver.

2. The method according to claim 1 wherein the current vehicle location is determined according to a global positioning system (GPS) signal.

3. The method according to claim 1 wherein the wireless data network access point is an IEEE 802.16 (WiMAX) access point.

4. The method according to claim 1 further comprising:
   determining that the vehicle is being used by an unauthorized operator; and
   transmitting an alert message.

5. The method according to claim 4 including shutting down operation of the vehicle in response to determining that the vehicle is being used by an unauthorized operator.

6. The method according to claim 1 including providing an access code or login to the wireless data network access point to enable access to the wireless data network.

7. The method according to claim 1 where the wireless data network access point is located using passive scanning.

8. The method according to claim 7 wherein the transmitting of the status information includes transmitting at least one of location data and vehicle sensor data.

9. The method according to claim 1 where the wireless data network access point is located using active scanning.

10. The method of claim 1, wherein the transmitting the status of the vehicle includes transmitting logged vehicle data corresponding to the path of the vehicle over a period of time.

11. A wireless tracking device locatable in a vehicle, the wireless tracking device comprising:
    a positioning system configured to periodically determine a location of the device;
    a processor connected to the positioning system and configured to receive vehicle sensor input indicating a vehicle status;
    a scanner configured to scan for an available wireless area network access point; and
    a wireless radio connected to the processor and configured to transmit data including at least one of location data and vehicle sensor data to the available wireless area network access point.

12. The wireless tracking device according to claim 11 wherein the processor is configured to receive the vehicle sensor data and generate vehicle condition data for transmission by the wireless radio to the wireless area network access point.

13. The wireless tracking device according to claim 12 wherein the vehicle sensor input includes at least one of vehicle speed, vehicle direction, car alarms signal, or key ignition detection signal.

14. The wireless tracking device according to claim 12 wherein the scanner is configured to scan at least one of the available wireless area network access points including a WLAN or WMAN configured to IEEE standards 802.11 or 802.16 (WiMAX).

15. The wireless tracking device according to claim 14 wherein the wireless radio passively scans for the available wireless area network access.

16. The wireless tracking device of claim 11, further comprising the wireless radio to transmit logged data corresponding to the path of the vehicle over a period of time.

17. A vehicle monitoring system comprising:
    a positioning system configured to periodically determine a location of a vehicle;
    a sensor configured to receive sensor data including vehicle status data;
    a microcontroller configured to receive the sensor data from the sensor, to determine a vehicle condition and to receive vehicle location data from the positioning system, wherein the microcontroller is further configured to shut down vehicle operation when the determined vehicle condition corresponds to the vehicle being operated by an unauthorized operator; and
    a wireless transmitter communicatively coupled to the microcontroller and configured to scan for and connect to an available wireless data network remote access point, and when connected, to transmit the vehicle condition and the vehicle location data to the remote data network access point.

18. The vehicle monitoring system according to claim 17 including a configuration device that provides at least one selectable mode of operation.

19. The vehicle monitoring system according to claim 18 wherein the at least one selectable mode of operation is selected from modes including passive scanning, active scanning, data transmission standard, or account management of the remote data network access point.

20. The vehicle monitoring system according to claim 17 wherein the wireless transmitter is further configured to transmit data to an endpoint, wherein the endpoint includes at least one of a computer, a website, a short message service (SMS) or an e-mail account.

* * * * *